Dec. 1, 1964     S. G. WOODWARD     3,159,151
FUEL SUPPLY SYSTEM
Filed Aug. 24, 1962     2 Sheets-Sheet 1
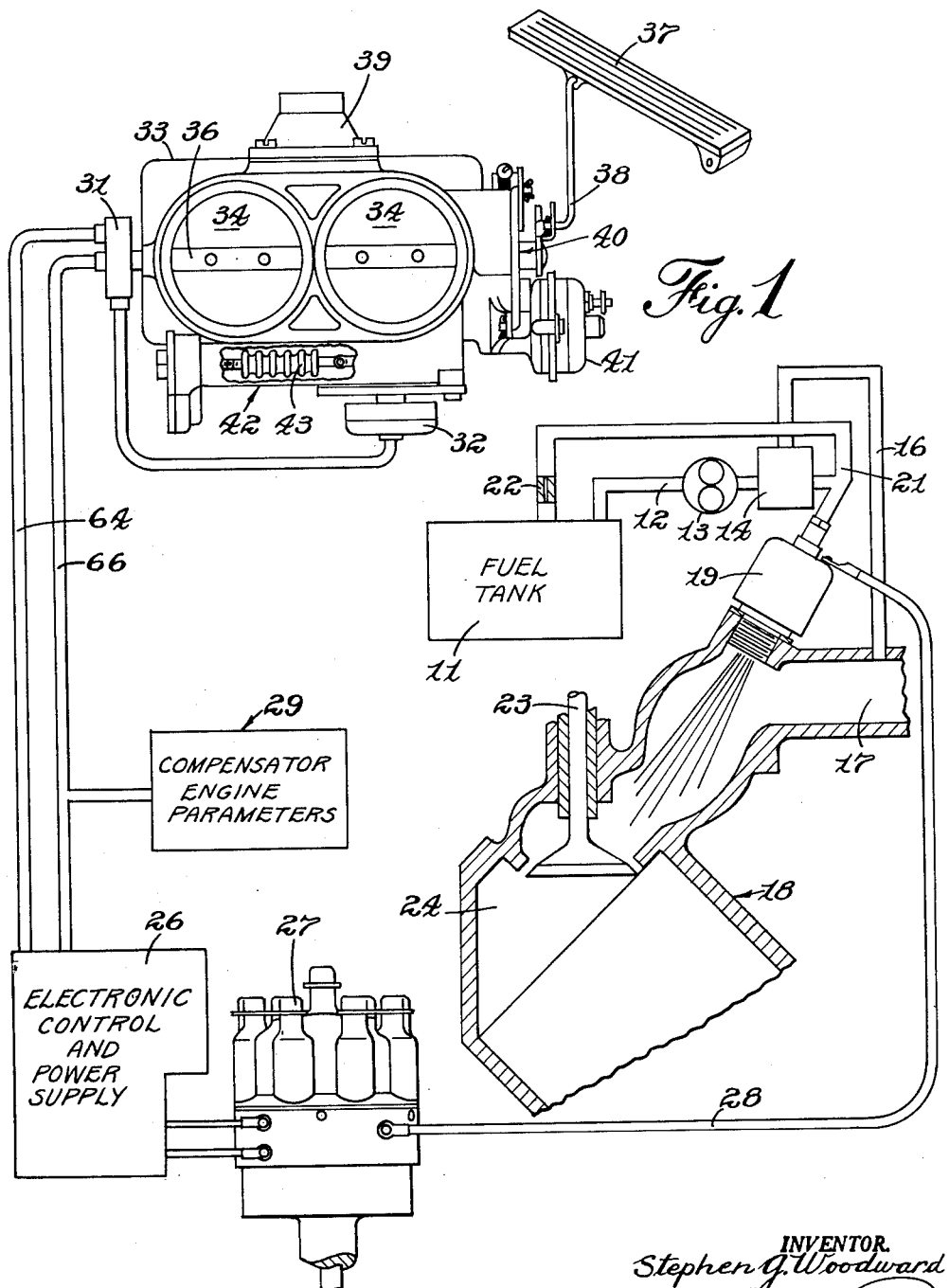
WITNESS:
Esther M. Stockton
INVENTOR.
Stephen G. Woodward
BY John Phillips Ryan
ATTORNEY Dec. 1, 1964   S. G. WOODWARD   3,159,151
FUEL SUPPLY SYSTEM
Filed Aug. 24, 1962   2 Sheets-Sheet 2
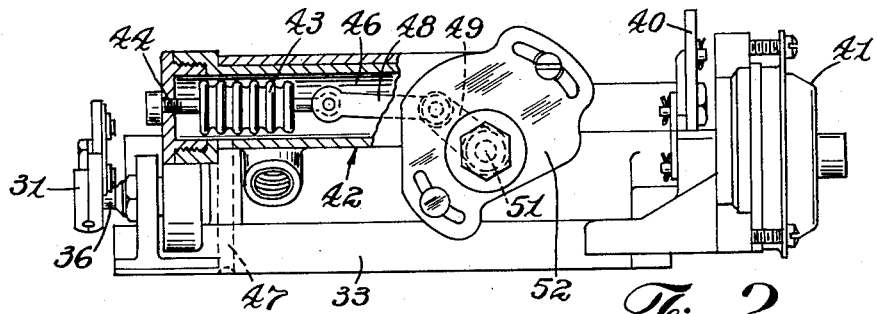
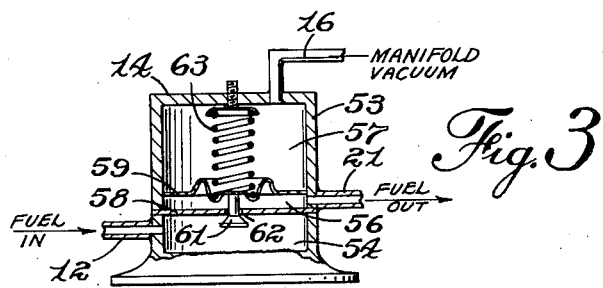
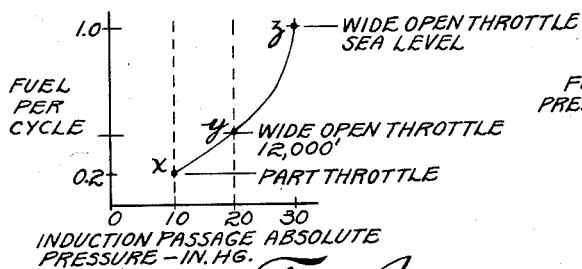
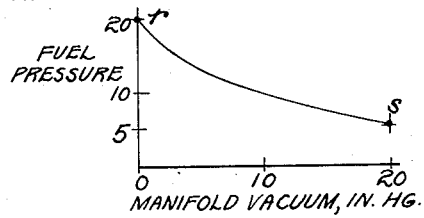
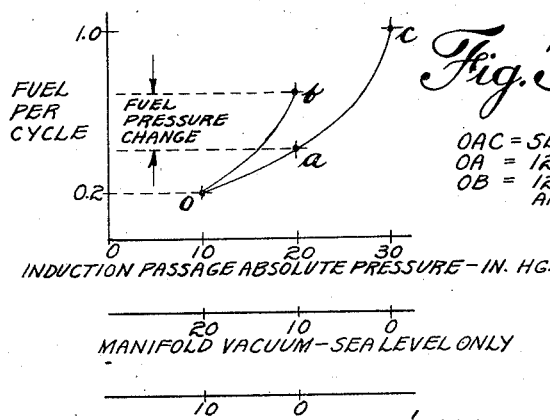
INVENTOR.
Stephen G. Woodward
BY John Phillip Ryan
ATTORNEY

United States Patent Office 3,159,151
Patented Dec. 1, 1964

3,159,151
FUEL SUPPLY SYSTEM
Stephen G. Woodward, Horseheads, N.Y., assignor to The Bendix Corporation, Elmira Heights, N.Y., a corporation of Delaware
Filed Aug. 24, 1962, Ser. No. 219,205
6 Claims. (Cl. 123—119)

The present invention relates generally to a fuel supply system for an internal combustion engine and more particularly to altitude compensated metering means for such a system.

In U.S. Patent 2,980,090 issued April 18, 1961, to Robert W. Sutton et al, assigned to the assignee of the present invention, there is shown a common rail fuel supply system wherein the quantity of fuel supply to the engine is varied by modulating the open time of an injector nozzle without varying the pressure of the fuel supplied to the injection nozzle. In the Sutton et al. device altitude compensation is provided by means effective to vary the open time of the injector nozzle as a function of change in atmospheric pressure.

In U.S. Patent 2,888,000 issued May 26, 1959, to Albert H. Winkler, assigned to the assignee of the present invention, there is shown a common rail fuel supply system wherein the injector nozzle is opened for a controlled time duration per cycle of the engine. In the Winkler device altitude compensation is provided by means effective to vary the pressure of the fuel supplied to the injector nozzle. The nozzle control signal duration is varied to a slight degree to meet certain parameters such as engine temperature, manifold vacuum, etc. Changes in these parameters change resistance values in a control signal circuit. One such resistance value is changed responsive to changes of manifold vacuum reacting against a set and predetermined spring pressure. However, manifold vacuum force under such circumstances does not reflect changes in ambient atmospheric pressure. The controlled time duration therefore cannot be said to be variable as a function of altitude. Altitude compensation in the system is provided by a regulator valve in the fuel delivery conduit. The valve includes atmospheric pressure responsive means for modulating the fuel pressure to increase or decrease the pressure of the fuel supplied to the injector nozzle.

The Sutton and Winkler devices do not compensate for altitude by simultaneously modulating both the open time of the injector nozzle and the pressure of the fuel supplied to the nozzle responsive to engine parameters reflecting the true engine requirements. Modulation of the controlled time duration of nozzle opening without modulating the fuel pressure responsive to engine requirements imposes difficult pulse width requirements on the control unit and requires costly valve structures. Modulation of the pressure of the fuel supplied to the injection nozzle by atmospheric responsive means without simultaneous modulation of the controlled time duration of nozzle opening to reflect ambient atmospheric pressures is undesirable because the fuel pressure will be uniformly modulated at all throttle settings. It is desirable that a fuel injection system proportionately modulate both the open time of the injection nozzle and the pressure of the fuel supplied to the nozzle and that the modulation be a function of exact engine parameters which truly reflects engine requirements at the ambient atmospheric pressure.

The present invention provides a composite fuel metering system where an absolute pressure metering concept is modified by a fuel regulator actuated by manifold vacuum to compensate for altitude changes. The absolute metering system for controlling the signal duration to the nozzle measures manifold pressure relative to a fixed evacuated capsule pressure. The manifold pressure inherently reflects variations due to changes in altitude in such an absolute metering system. This inherent manifold pressure reflection of altitude variations simply means that when the device is operated at sea level conditions 0 inches of manifold vacuum will be equatable to an ambient absolute pressure of 30 inches of Hg and when it is compared to a fixed value aneroid it will permit a predetermined aneroid movement. However, when the device is operated at an altitude of 12,000 feet 0 inches of manifold vacuum will then be equatable to an ambient absolute pressure of 20 inches of Hg and, therefore, the aneroid to which the manifold vacuum is compared will be allowed to expand a relatively greater amount.

The present invention utilizes a common rail fuel supply system and the injection nozzle is opened for a controlled time duration per cycle of the engine. The injector nozzle is energized as long as the control signal is received and the control signal duration is varied by engine parameters which change resistance values in a control circuit. One such resistance value is changed by the action of manifold pressure on an evacuated capsule operatively connected to a variable resistance. Altitude changes are inherently reflected in the communicated manifold pressure which acts upon the capsule or aneroid. A simple diaphragm valve in the fuel delivery conduit actuated by manifold vacuum also simultaneously and proportionately modulates the pressurized fuel supplied to the injector nozzle. This system will precisely meet all engine requirements under all altitude operating conditions.

The invention provides an injection nozzle that is opened for a variable controlled time duration and a fuel pressure regulator that varies with engine requirement but both the controlled time duration and the fuel supply pressure are proportionately varied over the entire range of throttle settings as opposed to an altitude compensated system having a variable controlled time duration and a constant fuel supply pressure or an altitude compensated system having a substantially constant controlled time duration and a fuel supply pressure uniformly varied regardless of the throttle settings. Thus the over-all metering effectiveness of the fuel supply system in the present invention is materially increased. The invention does not rely upon a direct altitude comparison but rather utilizes an engine parameter which automatically and efficiently incorporates altitude changes therein. Further, the system disclosed in this invention is proportionately efficient for all throttle settings rather than having a fuel reduction uniformly applied to the fuel supply with a resultant disproportionate fuel pressure modulation at lower throttle settings.

The present invention has as its object to provide a fuel injection system wherein a pure absolute pressure metering concept in conjunction with a manifold vacuum controlled fuel pressure regulator accomplishes altitude compensated precision fuel metering meeting all engine requirements.

Other objects and advantages will be readily apparent from the following detailed description taken in conjunction with the appended drawings, in which:

FIGURE 1 is a schematic view, with portions thereof in section and broken away, of a fuel supply system embodying the present invention;

FIGURE 2 is a front view, partly broken away, of the throttle body shown in FIGURE 1, particularly illustrating portions of the absolute pressure sensor means;

FIGURE 3 is a sectional view of the pressure regulator shown in FIGURE 1;

FIGURE 4 is a graphic illustration of the fuel requirements per engine cycle plotted against the induction passage absolute pressure in a non-altitude compensated fuel injection system, which uses absolute pressure as a basic metering control;

FIGURE 5 is a graphic illustration similar to FIGURE 4 of the fuel requirements per engine cycle plotted against the induction passage absolute pressure and/or manifold pressure at sea level and altitude in the altitude compensated fuel system of the present invention; and FIGURE 6 is a graphic illustration of the fuel supply pressure plotted against manifold vacuum.

Referring now to the drawings wherein like reference numerals and characters indicate like parts in the several views, in FIGURE 1 numeral 11 designates a source of fuel, 12 a delivery conduit with a supply pump 13 and a pressure regulator valve 14 therein. A conduit 16 communicates manifold vacuum from the induction passage 17 of an internal combustion engine generally designated as 18 to the pressure regulator valve. An injector nozzle 19 is connected to conduit 21. Conduit 21 with an appropriately sized restriction 22 is also connected back to the source of fuel making this a common rail fuel supply system. The nozzle is arranged to inject fuel into the induction passage anterior of the inlet valve 23.

The number of injection nozzles 19 may correspond with the number of combustion chambers 24 of the engine or the proportion of injectors to combustion chambers may be increased or decreased as needs dictate.

The injectors 19 including an energizable solenoid and valve are arranged to be actuated by an electronic control and power supply 26 which is triggered by and connected to the appropriate injector by the trigger-distributor unit 27. The unit 27 triggers or activates the electronic control and power supply 26 which then remains energized for a controlled time duration. The output of the control 26 is connected to the unit 27 distributor element and thence by connector 28 to the appropriate injector. The injector discharges fuel for the time duration that the electronic control remains energized. The time that the electronic control 26 remains energized is regulated by various sensory elements. These sensory elements are responsive to various parameters and include a compensator generally designated 29 controlled by various engine parameters, e.g., engine temperature, a sensory element 31 responsive to throttle movements and a sensory element 32 responsive to induction passage pressure.

The throttle body 33 is provided with a pair of throttle valves 34 affixed to the throttle shaft 36 journalled in the throttle body to control the air flow through the induction passage 17. The throttle shaft is rotated by a conventional accelerator pedal 37 through appropriate linkage 38. Throttle shaft movements actuate the sensory element 31. The throttle body 33 carries an accelerator control 39 of the type disclosed and claimed in copending application U.S. Serial No. 622,618 filed November 16, 1956, now Patent No. 3,106,196 in the names of Stephen G. Woodward and Curtis A. Hartman and assigned to the assignee of the present invention. A thermostatic control 41 is provided for warmup duration. The thermostatic control 41 includes a thermostatic element (not shown) and functions to set a fast idle cam and linkage generally designated 40 to obstruct the closing of the throttle valves under certain conditions in a manner well known in the art. The absolute pressure sensor, partly broken away and generally designated 42, is supported in the throttle body and actuates the sensory element 32.

Referring now to the front view of the throttle body shown in FIGURE 2, the absolute pressure sensor 42 includes an aneroid 43 secured to the throttle body at 44 and supported within the closed cylindrical chamber 46. Passage 47 connects the cylindrical chamber to the induction passage downstream or posterior of the throttle valve 34 and preferably connects at the point where conduit 16 connects with the induction passage. The aneroid's movable extremity is connected by links 48 and 49 to the shaft 51 which, in turn, is connected to the wiper arm of the potentiometer (not shown) forming a part of the sensory element 32 mounted on the adjustable support 52. The aneroid is responsive to the amount of manifold pressure communicated to the cylindrical passage and will expand and contract due to the differential pressures. Movement of the aneroid varies the potentiometer of sensory element 32 to regulate the time duration the electronic control 26 remains energized.

The fuel pressure regulator, best illustrated in FIGURE 3, comprises a housing 53 which is divided into chambers 54, 56 and 57. Chambers 54 and 56 are separated by a fixed apertured wall 58 and chambers 56 and 57 are separated by a diaphragm or movable wall 59. The diaphragm 59 supports a valve 61 which cooperates with the aperture or valve seat 62 in fixed wall 58. A spring 63 adjustably confined between the housing 53 and the movable wall 59 biases the valve 61 toward the valve open position. The conduit 16 communicates manifold vacuum to the chamber 57. Fuel under pressure is delivered to chamber 54 by conduit 12 and, depending on the degree of valve opening determined by the relative reactions of manifold vacuum and the spring bias, is allowed to flow into chamber 56 at the inlet pressure or a reduced pressure and thereafter is discharged into conduit 21.

Generally, fuel supply systems not having altitude compensation in their metering means will follow a fuel per cycle vs. induction passage absolute pressure curve similar to that illustrated in FIGURE 4. At sea level it is desirable that the ratio of fuel per cycle at wide open throttle to part throttle be approximately 5:1 but at altitude this ratio is reduced due to volumetric efficiency variations. When the utilizing engine operates at part throttle (sea level or altitude) the induction passage pressure is 10 inches of Hg and the fuel per cycle is at 0.2 (all graphic illustrations used in this description use general reference points and these values may vary somewhat in the actual embodiments). Therefore, at both sea level and altitude conditions the curve has a common starting point, namely point $x$. At sea level operation the absolute pressure of the induction passage at wide open throttle would be the same as the ambient atmospheric pressure since there is no manifold vacuum. The fuel per cycle value will be 1.0 and the ideal ratio for wide open throttle to part throttle will be attained. The system's sea level operating curve is $xyz$. When operating the system at altitude and wide open throttle there will be again no manifold vacuum but the absolute pressure of the induction passage at that point will be the same as the ambient atmospheric pressure. It will be seen that at 12,000 feet the ambient pressure is 20 inches of Hg and, therefore, wide open throttle will occur at point $y$ on the curve with the fuel per cycle being considerably reduced. The reduced air density at this altitude will also cause a reduction in the weight of air. However, the mixture ratio of fuel to air required at altitude for 20 inches of Hg pressure will be higher than at sea level since this is now the full load condition.

The altitude compensated metering means in the fuel supply system of the present invention will follow a fuel per cycle vs. induction passage absolute pressure curve similar to that illustrated in FIGURE 5. At continuous sea level operation the system will follow the curve $oac$ which is similar to the curve $xyz$ previously described. During altitude operation, assuming only the use of an absolute pressure sensory control 42 which varies the control of time duration, the system would substantially follow the curve $oa$. The device thus functions in a fashion similar to the prior art devices but will have slightly better operating characteristics because of the slight change in the time of controlled nozzle opening. It is to be noted, however, that the ratio of wide open throttle to part throttle for altitude operation is but slightly improved over the devices following the curve of FIGURE 4. When the system is combined with the fuel regulator 14, the device will follow the curve $ob$. The curve $ob$ has a steeper slope and the ratio of fuel injected at wide open throttle to part throttle is considerably improved. The degree of improvement between curves *oa* and *ob* represents the change of fuel pressure reflecting changes in manifold vacuum. In FIGURE 6 the change of fuel pressure is plotted against changes in manifold vacuum. It will be apparent that as the manifold vacuum approaches 20 inches of Hg, the part throttle condition, the fuel pressure as regulated by regulator 14 drops by a factor of almost 4 to the point *s* as opposed to the wide open throttle condition designated as point *r*.

In operation—fuel from source 11 is placed under pressure by pump 13 in delivery conduit 12 and regulator chamber 54. Manifold vacuum is communicated from induction passage 17 via the conduit 16 to the regulator chamber 57. At part throttle operation manifold vacuum will exert a suction of approximately 20 inches of Hg on the diaphragm 59 and will overcome most of the predetermined biasing force of spring 63 causing the valve 61 to considerably reduce the opening 62 in the fixed wall 58. The fuel at reduced pressure (designated at point *s* in FIGURE 6) will flow into chamber 56 and thence will flow through conduit 21 to the nozzle 19 or will be returned to the source through restriction 22. At wide open throttle operation the manifold vacuum will exert little or no suction on the diaphragm 59 thereby allowing the spring 63 to bias the valve 61 away from the seat 62 allowing the maximum fuel flow through the opening. The fuel will flow at relatively increased pressure (designated at point *r* in FIGURE 6) into chamber 56 and thence to the nozzle 19 or be returned to the source. Fuel pressure in conduit 21 and in nozzle 19 is thus varied through the action of regulator 14 through the action of the manifold vacuum acting upon the diaphragm 59 to change the bias of the spring 63 and change the position of the valve 61 relative to the opening 62. Upon an increase of manifold vacuum the valve will tend to close the opening and thereby decrease the pressure of the fuel in conduit 21. Conversely, upon a decrease of manifold vacuum the valve will tend to move out of the opening and thereby increase the pressure of the fuel in the conduit 21. Increasing the fuel pressure in conduit 21 for a given time duration of the injector nozzle opening has the effect of increasing the amount of fuel supplied to the engine. Conversely, decreasing the fuel pressure in conduit 21 has the effect of decreasing the amount of fuel supplied to the engine for a given time duration of injector nozzle opening.

Changes in the value of manifold vacuum are concomitantly reflected in the absolute induction passage pressure which is communicated to the absolute pressure sensor 42. Manifold pressure or the absolute induction passage pressure communicated by conduit 47 to the cylindrical chamber 46 will allow the aneroid 43 to expand or contract. When the manifold vacuum is 0 inches of Hg, it is 0 relative to the ambient pressures and the absolute induction passage pressures will, therefore, be at the ambient atmospheric pressure. Consequently, when the system is operated at sea level conditions and manifold vacuum at wide open throttle is 0 inches of Hg, the absolute induction passage pressure will be 30 inches of Hg and this is the reference pressure against which the aneroid must operate. However, when the system is operated at an altitude condition, i.e., 12,000 feet, and the manifold vacuum is again 0 inches of Hg, the absolute induction passage pressure will be approximately 20 inches of Hg, the ambient atmospheric pressure. This is the new reference pressure against which the aneroid must operate. Since at altitude the ambient pressure is less than at sea level, the evacuated aneroid will expand a greater amount at altitude than at sea level. The expansive and contractive movements of the aneroid 43 will be communicated to the potentiometer of the sensory element 32 to vary the resistance value in the particular control circuit. Variations in sensory element 32 output, as well as variations from sensory elements 31 and 39, are connected to the electronic control 26 by leads 64 and 66. The variation in the sensory element 32 varies the time constant (R-C circuit) of the electronic control 26 and thereby varies the time duration that the electronic timing unit 26 remains energized.

The absolute pressure sensor 42 and its associated sensory element 32 will lengthen or decrease the time duration the electronic unit remains energized. When the system is operated at sea level, the change in resistance in the sensory element 32 will be minimal because the relative difference between absolute induction passage pressure reflecting 0 inches of manifold vacuum and the aneroid pressure will permit at the most only a slight aneroid movement. Therefore, the controlled time duration of energization of the nozzle 19 will be at or close to its maximum duration and will allow a maximum amount of fuel per cycle to be injected into the induction passage. When the system is operated at altitude conditions, the change of resistance of the sensory element 32 will be progressively increased with an increase of altitude because the relative difference between absolute induction passage pressure reflecting 0 inches of manifold vacuum and the aneroid pressure will permit a greater degree of aneroid movement. Therefore, the controlled time duration of energization of the nozzle 19 will be considerably lessened from its maximum time duration and will reduce the amount of fuel per cycle which will be injected by the nozzle. Decreasing a given time duration of injection nozzle opening by decreasing the energization time of the electronic control unit has the effect of decreasing the amount of fuel supplied to the engine. The decrease is proportionately offset by the concomitant pressure change in the fuel supply owing to regulator 14 with the resultant fuel flow precisely meeting all engine requirements. Conversely, increasing of the time duration of the injection nozzle opening by increasing the energization time of the electronic control unit toward its established maximum time duration has the effect of increasing the amount of fuel supplied to the engine. The increase is offset by the concomitant change in the fuel regulator 14 with the resultant fuel flow precisely meeting all engine requirements.

While only one preferred embodiment of my invention has been described, it will be readily apparent to those skilled in the art that many changes or arrangements of parts may be made without departing from the spirit of my invention.

I claim:
1. A fuel supply system for an internal combustion engine having an induction passage, comprising:
 a source of fuel;
 a nozzle including an energizable valve member adapted to discharge fuel into the induction passage of the engine;
 common rail fuel conduit means including fuel pressurizing means for connecting the fuel source to the nozzle;
 a control device adapted to energize the nozzle valve member for actuating the nozzle valve;
 means operatively connected to the control device for periodically activating the control device to provide a pulsating flow of fuel to the engine;
 a closed chamber;
 a sealed elastic capsule mounted in said chamber with freedom for expansion and contraction responsive to changes of gaseous pressure within the chamber;
 a conduit passage connecting said chamber to said induction passage of the engine; and
 means responsive to expansion and contraction of said capsule for causing the duration of the pulses of fuel flow to vary in accordance with variations of gaseous pressure in said chamber.

2. In a fuel supply system for an internal combustion engine having an induction passage:
 a source of fuel including fuel pressurizing means;
 a nozzle actuatable for a controlled time duration adapted to discharge fuel to the engine;

conduit means for connecting the source to the nozzle;
means responsive to engine parameters for actuating the nozzle for the controlled time duration; and,
means for regulating the pressure of the fuel supplied to said nozzle including a first chamber connected to said conduit to receive fuel under full supply pressure;
a second chamber separated from the first chamber by a fixed diaphragm having a valved opening, and having a conduit connection to said nozzle, and
a third chamber separated from the second chamber by a flexible diaphragm and having a conduit connection with the induction passage of the engine, and
a valve controlling the opening through the fixed diaphragm, mounted on the flexible diaphragm in position to close said opening responsive to fuel pressure in said second chamber, resisted by the gaseous pressure in said third chamber.

3. A fuel supply system for an internal combustion engine having an induction passage, comprising:
a source of fuel;
a nozzle including an energizable valve member adapted to discharge fuel to the engine;
common rail fuel conduit means including a pressurizing pump for connecting the fuel source to the nozzle;
a pressure reducing valve means for regulating the pressure of the fuel supplied to the nozzle, and
means responsive to pressure in the induction passage of the engine for urging said valve toward open position;
a control device adapted to energize the nozzle valve member for actuating the nozzle;
means operatively connected to the control device for periodically activating the control device; and,
means including an aneroid member responsive to induction passage pressure for varying the time that the control device remains activated.

4. A fuel supply system for an internal combustion engine having a source of fuel including fuel pressurizing means and an induction passage, comprising:
a nozzle adapted to discharge fuel to the engine;
a conduit connecting the nozzle to the source;
a valve in the nozzle;
means for opening the valve for a time duration controlled as a function of an engine operating condition;
a regulator valve in one of said conduits for reducing the pressure of the fuel supplied to the nozzle including resilient means urging the regulator valve towards an open position, and means responsive to induction passage pressure urging the regulator valve towards a closed position;
and means responsive to variations of absolute pressure in the induction passage of the engine for correspondingly varying the length of time during which the nozzle valve is open.

5. A fuel supply system as set forth in claim 1 in which the means for periodically activating the control device includes an electronic timing circuit including a resistance-capacity relaxation unit; and
the means for varying the duration of the pulses of fuel flow includes a variable resistor in said relaxation unit, and
means connecting the elastic capsule to said variable resistor to vary the resistance of the resistor directly in accordance with variations of pressure in said chamber.

6. A fuel supply system as set forth in claim 1 including further adjustable spring means opposing closure of said valve.

References Cited in the file of this patent
UNITED STATES PATENTS

| | | |
|---|---|---|
| 2,918,911 | Guiot | Dec. 29, 1959 |
| 2,948,273 | Suttle | Aug. 9, 1960 |